UNITED STATES PATENT OFFICE 2,466,509

FLUORIDE GLASS

Kuan-Han Sun, Rochester, N. Y., assignor to Eastman Kodak Company, Rochester, N. Y., a corporation of New Jersey No Drawing. Application August 9, 1946, Serial No. 689,527

5 Claims. (Cl. 106—47)

This invention relates to fluoride glass.

In the application, Serial No. 568,314, filed by Maurice L. Huggins and the present inventor December 15, 1944, there are described numerous examples of fluoride glasses, all of which contain at least 12 weight per cent or 25 cationic per cent of beryllium fluoride. Also in the application Serial No. 660,308, filed April 6, 1946, by Thomas E. Callear and the present inventor, there are examples in which the lowest beryllium fluoride content is 3 weight per cent or 10 cationic per cent.

I have now discovered that glass composed entirely of fluorides may be made with aluminum fluoride as the only glassifier, beryllium fluoride being absent entirely or present in an amount in cationic percentages less than specified in the above applications.

The present glasses have a higher refractive index than those described in the first application mentioned above, this being higher than 1.4, and a higher Abbé value than those in the second application. They have an Abbé value in the neighborhood of 95.

The following table gives two examples containing only the fluorides of magnesium, strontium, lead, and aluminum, the proportions of each being given both in weight and mole per cent, in the columns headed W and C, respectively.

Table I

|  | 1 | | 2 | |
|---|---|---|---|---|
|  | W | C | W | C |
| Magnesium fluoride | 9.1 | 20 | 12.2 | 24 |
| Strontium fluoride | 18.4 | 20 | 12.3 | 12 |
| Lead fluoride | 53.9 | 30 | 48.0 | 24 |
| Aluminum fluoride | 18.6 | 30 | 27.5 | 40 |

Table II gives five examples containing a larger number of fluorides. In general, a mixture of a larger number of ingredients is less liable to devitrify.

Table II

|  | 3 | | 4 | | 5 | | 6 | | 7 | |
|---|---|---|---|---|---|---|---|---|---|---|
|  | W | C | W | C | W | C | W | C | W | C |
| MgF$_2$ | 3.6 | 10 | 9.4 | 20 | 4.0 | 10 | 7.4 | 18 | 9.9 | 20 |
| CaF$_2$ | 0.3 | 1 | 0.4 | 1 | 0.4 | 1 | 0.4 | 1 | 0.4 | 1 |
| SrF$_2$ |  |  | 14.2 | 15 | 8.0 | 10 | 1.6 | 2 | 19.9 | 20 |
| BaF$_2$ | 2.1 | 2 | 2.7 | 2 | 2.2 | 2 | 2.6 | 2 | 2.8 | 2 |
| PbF$_2$ | 72.8 | 50 | 46.4 | 25 | 62.7 | 40 | 64.6 | 40 | 38.8 | 20 |
| LaF$_3$ | 1.2 | 1 | 1.5 | 1 | 1.3 | 1 | 1.3 | 1 | 1.6 | 1 |
| CeF$_3$ | 1.2 | 1 | 1.5 | 1 | 1.2 | 1 | 1.3 | 1 | 1.6 | 1 |
| ThF$_4$ | 1.8 | 1 | 2.3 | 1 | 2.0 | 1 | 2.0 | 1 | 2.4 | 1 |
| AlF$_3$ | 17.0 | 34 | 21.6 | 34 | 18.2 | 34 | 18.8 | 34 | 22.6 | 34 |

The ingredients are melted in a covered platinum crucible at a temperature of about 950° C. The aluminum fluoride used is obtained by drying the commercial product AlF$_3.x$H$_2$O which contains about 40 per cent water. The resulting water-free product may contain some oxy-fluoride. Ten or twenty per cent of ammonium acid fluoride, NH$_4$HF$_2$, may be added to eliminate oxide flakes which may occur. A clear and fluid liquid is obtained after a certain length of heating. A glass is obtained when the liquid is cooled down extremely rapidly.

In general, the glass batch contains 10 to 30 mole per cent of magnesium fluoride; 1 to 25 mole per cent of fluorides of calcium, strontium, and barium, the proportion of strontium being preferably but not necessarily high; 0 to 3 mole per cent of each of the fluorides of lanthanum, cerium, and thorium; 20 to 55 mole per cent of lead fluoride; and 25 to 45 mole per cent, and preferably between 30 and 40, of aluminum fluoride.

When in the claims I specify "fluoride selected from the fluorides," I do not mean "a fluoride," but use the word "fluoride" in a collective sense to mean one or more fluorides.

While I describe the glasses as being beryllium-free and this is my preferred embodiment, I do not exclude the presence of a small amount, up to about 10 mole per cent, which is less than I formerly thought necessary.

Having thus described my invention, what I claim is:

1. A fluoride glass resulting from a batch containing in mole per cent: magnesium fluoride, 10 to 30; fluoride selected from the group consisting of the fluorides of calcium, strontium, and barium, and mixtures thereof, 1 to 25; the fluorides of lanthanum, cerium, and thorium, 0 to 3 each; lead fluoride, 20 to 55; aluminum fluoride, 25 to 45; and beryllium fluoride, 0 to 10.

2. A fluoride glass resulting from a batch containing: magnesium fluoride, 3 to 13 weight per cent; strontium fluoride, 1 to 20 weight per cent; lead fluoride, 35 to 73 weight per cent; and aluminum fluoride, 17 to 28 weight per cent; and containing 0 to 5 weight per cent of beryllium fluoride.

3. A beryllium-free fluoride glass resulting from a batch containing magnesium fluoride, 10 to 30 mole per cent; strontium fluoride, 2 to 25 mole per cent; lead fluoride, 20 to 50 mole per cent; and aluminum fluoride, 30 to 40 mole per cent.

4. A beryllium-free fluoride glass resulting from a batch comprising in weight per cent: magnesium fluoride, 3 to 13; fluoride selected from the fluorides of calcium, strontium, and barium, and mixtures thereof, 2 to 20; the fluorides of lanthanum, cerium, and thorium, 0 to 5 each; lead fluoride, 45 to 77; aluminum fluoride, 17 to 28.

5. A beryllium-free fluoride glass resulting from a batch comprising in weight per cent: magnesium fluoride, 3 to 13; fluoride selected from the group consisting of the fluorides of calcium, strontium, and barium, and mixtures thereof, 13 to 20, of which at least 8 per cent is strontium fluoride; the fluorides of lanthanum, cerium, and thorium, 0 to 5 each; lead fluoride, 45 to 77; aluminum fluoride, 17 to 28.

KUAN-HAN SUN.

No references cited.